United States Patent Office 3,508,876
Patented Apr. 28, 1970

3,508,876
METHOD FOR TRACING THE FLOW OF WATER IN SUBTERRANEAN FORMATIONS
Orville L. Polly, Long Beach, Calif., assignor to Union Oil Company of California, Los Angeles, Calif., a corporation of California
No Drawing. Filed Oct. 3, 1967, Ser. No. 672,452
Int. Cl. G01n *31/22, 33/24;* E21b *47/10*
U.S. Cl. 23—230                                  16 Claims

ABSTRACT OF THE DISCLOSURE

A method for tracing the flow of water through a subterranean formation in which a water-soluble aldehyde is added to the water at a selected point and samples of water are withdrawn from the formation at one or more points remote from the point of addition and analyzed for the presence of aldehyde.

---

This invention relates to the study of water flow and more particularly is concerned with a method for tracing the flow of water in subterranean formations.

It is often desired to ascertain the flow patttern of water through porous subterranean formations, such as petroleum reservoirs. Methods for tracing the flow of water in subterranean areas are useful in the oil well treating field and are especially useful in tracing the flow of an aqueous flooding medium through an oil-bearing formation as from an input to an output well. Accordingly, it has been suggested that various agents be added to the water at an injection point and that a sample of the water withdrawn at a remote point be analyzed for the presence of the tracer material to indicate the passage of the water from the injection point to the recovery point.

In order that a material be useful as a chemical tracer in the study of the flow of subterranean water, the tracer must be stable and relatively unabsorbed and unreactive in the presence of formation water, oil and rock. Further, the tracer must be easily identified at low concentrations in the produced waters, preferably by simple color tests. It is also desirable that the tracer be relatively inexpensive and easy to handle, and possess a high water solubility. While several materials have been proposed which are generally useful as tracers, it frequently becomes necessary in the study of complex flow systems to inject a number of different tracer agents at different injection points and to analyze water withdrawn at one or more recovery points for the presence of these tracers. Also, one or more of the known tracer materials may not be useful in a particular formation because of interference by natural or injected constituents in the formation. Thus, there exists a demand for a number of chemical materials suitable as tracers.

Accordingly, a principal object of the present invention is to provide a method for tracing the flow of water employing a distinctive chemical tracer. Another object is to provide a method for studying the flow of aqueous media through a subterranean petroleum reservoir from an injection well to a recovery well. Other objects and advantages of the invention will be obvious to those skilled in the art from the following more detailed description.

In accordance with the method of the present invention for tracing the flow of water in subterranean formations, a water-soluble aldyde is added to the water at an origin point and portions of the water obtained at a recovery point analyzed for aldehyde as an indication of derivation or flow from the origin point.

The water-soluble aldehydes useful in the practice of this invention include those aldehydes having a solubility greater than about 5 parts in 100 parts of water at injection conditions of temperature and pressure. More specifically, the water-soluble aldehydes useful as tracers include formaldehyde, acetaldehyde, acrolein and crotonaldehyde. Of these, formaldehyde is particularly preferred in many tracer applications. Formaldehyde is conveniently available as formalin, an aqueous 36 to 38 weight percent solution, which can be added directly to the water whose flow is to be traced or diluted prior to addition. Formaldehyde, or formalin, is particularly suited for use as a tracer in petroleum reservoirs since these reservoirs ordinarily constitute a reducing environment and formaldehyde is likewise nonoxidizing. Further, formaldehyde is not attacked by bacteria, since it is toxic to these organisms.

The water soluble aldehyde is employed in amounts sufficient to enable detection at the recovery point after dilution with formation water. Accordingly, it is preferred that sufficient aldehyde be added at the origin to produce a concentration of at least 10 p.p.m. at the recovery point. Although generally the aldehyde can be added up to its limit of solubility, usually more dilute concentrations are preferred. In one mode of practicing the invention, aldehyde is added in an amount sufficient to obtain a concentration of about 25 p.p.m. to 200 p.p.m. at the origin point. In another mode of practicing the invention, a slug of relatively concentrated aqueous aldehyde solution is injected at an origin point, such as a water injection well communicating with a subterranean formation. The injected aldehyde solution is then forced through the formation using an aqueous flooding medium. Water samples are withdrawn at one or more recovery wells spaced apart from the injection well and analyzed for the presence of aldehydes to indicate the derivation of water from the input well.

The analysis for the presence of aldehyde in water obtained at the recovery point can be accomplished by placing a small quantity of water, usually about 0.5 ml., on a spot test plate and adding about 5 drops of saturated alcoholic solution of gallic acid. The gallic acid is mixed into the water and the mixture floated onto about ½ cc. of concentrated sulfuric acid on a white spot plate. If aldehyde is present, indicating flow of water from the origin point, a light green to violet color is produced, the exact color depending upon the concentration of aldehyde. If the aldehyde is not present, indicating a flow of water from a source other than the origin point, the water spot remains substantially colorless.

EXAMPLE I

An aqueous solution of formaldehyde is employed as a tracer in a water flooding operation. Approximately 25 barrels of aqueous 37 percent formalin is pumped into a water injection well. Normal water injection of about 300 barrels per day is then resumed. Samples of production water are collected daily from surrounding producing wells and tested for the presence of formaldehyde by adding gallic and sulfuric acid in the above-described manner. After 88 days the tracer appeared in a nearby producing well located about 1200 feet from the injection well. The following is a summary of test results on the well in which the tracer is eventually discovered.

| Days After Injection: | Test color |
|---|---|
| 30 | Colorless. |
| 60 | Colorless. |
| 88 | Light green. |

While one application of the invention has been described, it will be apparent that the invention can be employed in other applications, such as for instance tracing the possible contamination of water in water wells and determining the rate of flow of liquid from one well to

Having now described the invention, I claim:

1. A method for tracing the flow of water which comprises adding a water-soluble aldehyde to the water at an origin point, recovering a sample of water at a recovery point, and analyzing the sample for the presence of aldehyde to indicate water derivation from the origin point.

2. The method defined in claim 1 wherein said aldehyde has a water solubility in excess of 5 parts per 100 parts of water at injection conditions of temperature and pressure.

3. The method defined in claim 1 wherein said aldehyde is selected from the group consisting of formaldehyde, acetaldehyde, crotonaldehyde and acrolein.

4. The method defined in claim 1 wherein said aldehyde is formaldehyde.

5. The method defined in claim 4 wherein said formaldehyde is employed in aqueous solution.

6. The method defined in claim 1 wherein the sample of recovered water is analyzed by adding a small amount of gallic acid to a small volume of water and thereafter contacting this solution with concentrated sulfuric acid.

7. The method defined in claim 1 wherein sufficient of saeid aldehyde is added at the origin point to provide detectable concentrations of aldehyde at the recovery point.

8. A method for tracing the flow of an aqueous medium through a subterranean petroleum reservoir from an input well to an output well, which comprises:
   adding a water-soluble aldehyde to the aqueous medium at the input well;
   recovering a sample of water at the output well; and
   analyzing the recovered water for aldehyde to indicate water derivation from the input well.

9. The method defined in claim 8 wherein a slug of aqueous aldehyde solution is injected into the input well and followed by the injection of an aqueous medium.

10. The method defined in claim 9 wherein said aqueous aldehyde solution is an aqueous solution of formaldehyde.

11. The method defined in claim 8 wherein the presence of aldehyde is detected by adding a small amount of gallic acid to a small volume of water and thereafter contacting said mixture with concentrated sulfuric acid.

12. The method defined in claim 8 wherein sufficient of said aldehyde is added at the input well to produce a concentration of aldehyde at the output well of at least about 10 p.p.m.

13. A method for tracing the flow of aqueous flooding medium through a petroleum reservoir from an input well to an output well, which comprises:
   injecting a sufficient quantity of an aqueous aldehyde solution into the input well to provide detectable concentrations of aldehyde at the output well;
   thereafter injecting aqueous flooding medium into said input well;
   obtaining a sample of recovered water from a spaced output well; and
   analyzing the sample of recovered water for aldehyde as an indication of water derivation from the input well.

14. The method defined in claim 13 wherein the aqueous aldehyde solution is an aqueous solution of formaldehyde.

15. The method defined in claim 14 wherein the aqueous solution of formaldehyde contains about 37 weight percent formaldehyde.

16. The method defined in claim 13 wherein the sample of recovered water is analyzed by adding a small amount of gallic acid to a volume of water and thereafter contacting said mixture with concentrated sulfuric acid.

References Cited

UNITED STATES PATENTS

| | | |
|---|---|---|
| 2,553,900 | 5/1951 | Doan et al. |
| 3,003,856 | 10/1961 | Boyd. |

FOREIGN PATENTS

| | | |
|---|---|---|
| 691,812 | 8/1964 | Canada. |

MORRIS O. WOLK, Primary Examiner

R. M. REESE, Assistant Examiner

U.S. Cl. X.R.

166—252